(12) United States Patent
Juels et al.

(10) Patent No.: US 12,360,799 B1
(45) Date of Patent: Jul. 15, 2025

(54) COMPUTER NETWORK TRANSACTION SEQUENCING METHOD AND SYSTEM

(71) Applicant: SmartContract Chainlink Limited SEZC, Grand Cayman (KY)

(72) Inventors: Ari Juels, Grand Cayman (KY); Lorenz Breidenbach, Grand Cayman (KY)

(73) Assignee: SmartContract Chainlink Limited SEZC, Grand Cayman (KY)

( * ) Notice: Subject to any disclaimer, the term of this patent is extended or adjusted under 35 U.S.C. 154(b) by 561 days.

(21) Appl. No.: 17/471,035

(22) Filed: Sep. 9, 2021

Related U.S. Application Data (60) Provisional application No. 63/076,296, filed on Sep. 9, 2020.

(51) Int. Cl.
*G06F 9/46* (2006.01)
*H04L 67/104* (2022.01)

(52) U.S. Cl.
CPC ............ *G06F 9/466* (2013.01); *H04L 67/104* (2013.01)

(58) Field of Classification Search
CPC ..... H04L 2209/56; H04L 9/50; H04L 67/104; G06F 9/466
See application file for complete search history.

(56) References Cited

U.S. PATENT DOCUMENTS

2018/0060834 A1* 3/2018 Mathison ............. G06Q 20/027
2020/0034929 A1* 1/2020 Rao ........................ H04J 3/065

OTHER PUBLICATIONS

Ellis et al. ChainLink a Decentralized Oracle Network. Sep. 2017. (Year: 2017).*

* cited by examiner

*Primary Examiner* — Bryan Y Lee
(74) *Attorney, Agent, or Firm* — Potomac Law Group, PLLC; Marc S. Kaufman (57) ABSTRACT

A transaction ordering system and method for sequencing transactions processed by a decentralized network in which nodes communicate with a peer-to-peer protocol to process transactions for the exchange of value in the form of main chain assets. Transaction sequencing is accomplished by an auxiliary decentralized network including multiple oracle nodes communication through a peer-to-peer protocol, wherein the auxiliary decentralized network does not store value in the form of mainchain assets and wherein the auxiliary decentralized network is configured to; receive a set of transactions to be executed by the decentralized network; create, based on a predetermined policy, ordering information indicating a sequence in which transactions in the set of transactions are to be processed; and transmit the ordering information to a mempool of decentralized network for execution of the transactions, by the decentralized network, in the sequence.

28 Claims, 4 Drawing Sheets

COMPUTER NETWORK TRANSACTION SEQUENCING METHOD AND SYSTEM

RELATED APPLICATION DATA

This application claims priority to U.S. Prov. App. Ser. No. 63/076,296, the entire disclosure of which is incorporated herein.

BACKGROUND

Distributed ledger technology (DLT), such as Blockchain has been deployed in recent years to provide "trustless" transactions between parties. In other words, DLT allows parties who do not have a trust relationship, or possibly even each other's identity, to exchange information and conduct various transactions in an accurate manner. This is accomplished because DLT systems recording information on a shared ledger in a manner that makes it very difficult to change, hack, or cheat the system.

A blockchain is a type of DLT and is essentially a digital ledger of transactions that is duplicated and distributed across a network of computer systems that serve as nodes on the network. Each block in the chain contains a record of multiple transactions, and every time a new transaction occurs on the blockchain, a record of that transaction is added to every participant's ledger. Blockchain transactions are recorded with an immutable cryptographic signature called a hash.

Executable code, referred to as "smart contracts" can be stored in a DLT system, i.e. "on-chain" in an immutable manner, similar to the manner is which transactions are stored. This allows smart contracts to provide trustless execution of various functions in an automated manner. However, in order to be pragmatic, smart contracts often need to receive dynamic data that is not stored on the DLT, i.e., data stored "offchain", such as pricing information and weather information. This data is received from trusted sources of data called "oracles." For example, a crop insurance policy can be executed by a smart contract and make a payment to any party who has paid a premium in the event that precipitation in a specific geographic region has been less than a predetermined amount. The level of precipitation can be received from an oracle. Of course, the oracle must be accurate and trusted by the insurer and all insured parties in order for this insurance to be effective. However, in conventional systems, the need to trust the accuracy of oracles often defeats much of the purpose (e.g., trustless transactions) of DLT systems. The CHAINLINK™ protocol provides a decentralized oracle network that results in reliable, tamper-proof inputs and outputs for complex smart contracts on any blockchain or other DLT system. This has solved the "trust problem" of conventional oracles.

Conventional blockchain designs are ephemerally centralized, at least to some extent. Miners and/or validators can order transactions however they choose. Transaction order can also be manipulated by users as a function of the network transaction fees they pay (e.g., "gas" in Ethereum networks) and to some extent by means of fast network connections. Front-running by bots that harms ordinary users and is analogous to high-frequency trading on Wall Street is already prevalent and well documented in decentralized ledgers. Layer-2 technologies such as rollups don't solve the problem, but merely re-centralize ordering with the entity that creates a rollup.

SUMMARY

Oracles are often viewed as services with a single objective: to forward data from off-chain resources onto blockchains. However, the applicants have developed systems and methods in which oracles can compute, store, and bidirectionally transmit data. The disclosed implementations satisfy increased service requirements of blockchains and increasingly multi-faceted technologies that rely on oracle networks and allow oracles serve as a connector between on-chain and off-chain systems.

Disclosed implementations facilitate an increasingly expansive role for oracles and oracle networks in which they complement and enhance high-performance DLT systems by providing fast, trusted and confidentiality-preserving universal connectivity for smart contracts. Oracle networks of the disclosed implementations can be thought of as utilities suitable for various tasks such as exporting trusted, DLT-grade data to systems beyond the DLT ecosystem.

The disclosed implementations leverage a "Wing Ledger" (also referred to as a "Distributed Oracle Network (DON)" and/or and "Auxiliary Decentralized Network" herein) that is a permissioned consensus protocol executed by a constellation of oracle nodes and which provides interfaces to highly efficient yet decentralized computing resources. DONs allow for scaling, incentive-based (crypto-economic) security, confidentiality, and order-fairness for transactions. DONs can be leveraged to enhance the capabilities of smart contracts on a "main chain" of a DLT system through realizations of the three basic resources in computing systems: networking, storage, and computation. DONs enforce the security properties of the "CIA triad"; confidentiality, integrity, and availability, as well as accountability. The phrase "main chain", as used herein, refers to a network of nodes in which the transactions being tracked are recorded on a distributed ledger.

DONs are formed by groups of oracle nodes that cooperate to fulfill a specific job or choose to establish a relationship in order to provide persistent services to clients. The functionalities of a DON are realized by two types of modules which are referred to as "executable modules" and "connector modules" herein. Executable modules are programs that run in a decentralized manner on the DON. They are designed for off-chain support of smart contracts. In some implementations executable modules can have some limitations, like the inability to directly store main-chain assets. However, the executable modules provide important benefits such as high performance and the ability to perform confidential computation. Connector modules are interfaces to external resources called by executable modules. Connector modules can be a generalization of Chainlink™ adaptors in that connector modules can leverage joint computation by DON nodes to achieve new features, such as recording reports in encrypted form on a DON for consumption by an executable module. Through the use of DONs, the disclosed implementations provide decentralized networks with technical improvements in the areas of scaling, security, confidentiality, and order-fairness for transactions.

In disclosed implementations, decentralization of report generation across oracle nodes helps ensure security even when some nodes are corrupted. Equally important, though, is ensuring that node operators have a financial incentive to behave correctly. "Staking", i.e., requiring nodes to provide deposits and confiscating these deposits in case of misbehavior is one important known incentive design However, disclosed implementations provide a novel protocol for identifying attempts to subvert the system that includes processes other than staking.

Blockchains and other decentralized networks provide unprecedented transparency for smart contracts and the resulting applications. However, there is a tension between transparency and confidentiality. For example, users' decentralized exchange transactions are recorded on chain, making it easy to monitor exchange behavior but exposing transactions to the entire world. In disclosed implementations oracle networks play a pivotal role in the design of systems that combine transparency with confidentiality.

Disclosed implementations include "Mempool Services" (MS) that can be leveraged to ensure fair ordering for transactions. A "mempool" is a data storage where all validated transactions of a decentralized network are stored prior to being confirmed by the network. MS can be used to enable a DON to implement rigorous, order-fairness and prevent front-running of oracle reports and other transaction ordering manipulation.

A first aspect of the invention relates to a transaction ordering system for sequencing transactions processed by a decentralized network in which nodes communicate with a peer-to-peer protocol to process transactions, for example, transactions for the exchange of value in the form of main chain assets, the system comprising an auxiliary decentralized network including multiple oracle nodes communication through a peer-to-peer protocol, wherein the auxiliary decentralized network is configured to;

receive a set of transactions to be executed by the decentralized network;
    create, based on a predetermined policy, ordering information indicating a sequence in which transactions in the set of transactions are to be processed; and
    transmit the ordering information to a mempool of decentralized network for execution of the transactions, by the decentralized network, in the sequence.

DETAILED DESCRIPTION

The DON of the disclosed implementations includes both a novel data model that oracle nodes maintain and a core API layered on top of the data model. The term "ledger" (lower case), denoted by $\mathcal{L}$, is used herein to refer to the underlying data structure of a DLT system. In modern Byzantine Fault Tolerance (BFT) algorithms, nodes digitally sign messages on the ledger. We assume for convenience that $\mathcal{L}$ has an associated public key $pk_{\mathcal{L}}$ and that its contents are signed by the corresponding private key. This general notation can accommodate threshold signatures which are convenient, as they enable a persistent identity for a DON even with changes of membership in the nodes that constitute the DON. Therefore, it is assumed that $pk_{\mathcal{L}}$ is secret-sha red in a (k,n)-threshold manned for a security parameter k. A message $\mathcal{L}$ takes on the form M=(m, z, |$T_z$|) where m is a string, z is a unique sequential index number, and $T_z$ is an optional timestamp. We let $\mathcal{L}[z]$ the denote the unique message M=(m, z, |$T_z$|) on $\mathcal{L}$ (or $\bot$ if a $z^{th}$ message hasn't yet been written). Messages can be written in the syntax of in the form m=(message type: payload). Message types can indicate the function of a particular message.

A set of n oracle nodes, i.e., parties running the ledger, can be denoted by $\mathcal{O} = \{\mathcal{O}_{i\ i}\}_{i=1}^{n}$. Such a set of parties is also referred to as a "committee" herein. For simplicity, it is assumed that the set of oracles implementing DON functionality is identical with that maintaining the message, but they can be distinct. Let $pki_i$ denote the public key of p layer $\mathcal{O}_i$, and $ski_i$ can denote the corresponding private key. Most BFT algorithms require at least n=3f+1 nodes, where f is the number of potentially faulty nodes. The ledger is assumed to be "honest" if it has greater than a ⅔-fraction of honest nodes. Typically for such algorithms, secret-sharing of sk would involve k=2f+1, which we is also assumed in disclosed implementations. For conciseness, a ledger is "honest" if it contains at least k honest nodes. $Sig_{pk}(m)$ denotes a signature on message m with respect to pk, i.e., using corresponding private key sk. S denotes a data source and S denotes a set of data sources. A DON can support multiple main chains.

Figure 1:
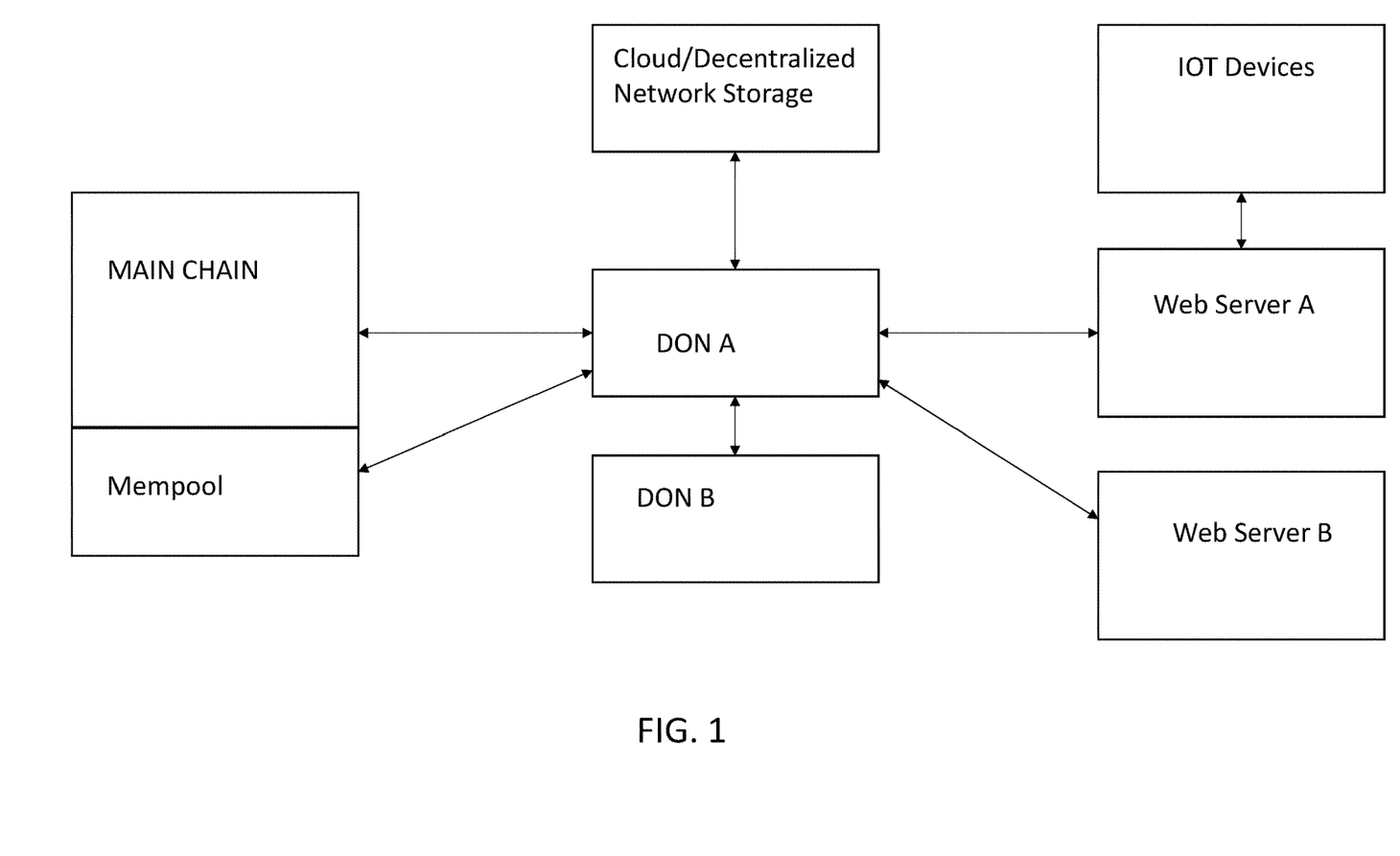
FIG. 1 is a schematic diagram of a computing architecture used in connection with disclosed implementations.

DONs can provide an interface described in terms of the three resources typically used to characterize computing systems: networking, compute, and storage. The DON maintains a set of connector modules through which it can send and receive data from systems external to the DON. Connector modules may be bidirectional and may specify multi-party protocols as well as cryptographic functionality such as multi-party computation. Examples of external resources for which connector modules might be created are shown in FIG. 1. These external resources include:

1. Blockchains (MAIN CHAIN): A connector can define how to send transactions to a blockchain and how to read blocks, individual transactions, or other state from it. A connector can also be defined for a blockchain's mempool to provide the above-noted mempool services.
2. Web servers: Connector modules can define APIs through which data may be retrieved from web servers, including legacy systems that are not specially adapted for interfacing with DONs. Such connector modules can also include APIs to send data to such web servers. The web servers may serve as gateways to additional resources, such as Internet-of-Things (IoT) devices.
3. External storage: A connector can define methods to read and write to external storage, such as a decentralized file system or cloud storage.
4. Other DONs: A connector for interfacing with a separate DON would include the public key of that DON, enabling verification of data retrieved from that DON as well as rules for sending messages to the DON.

When deployed, DONs can include a set of building block connectors for commonly used external resources and will further allow DON-specific connectors to be published by DON nodes. Some connector modules may be constructed in a way that ensures the persistence and availability of external resources controlled by a DON. For example, cloud storage may require maintenance of a cloud services account. A DON can manage private keys on behalf of users and/or executable modules. Therefore, the DON can control resources, such as cryptocurrency that may be used, e.g., for sending transactions on a target blockchain. Connector modules may be called directly by users or may be called by executable modules.

An executable module includes logic and one or more triggering events. The logic can include multiple designated entry points ($logic_1$, $logic_2$, . . . , $logic_d$). To ensure the full auditability of the DON, an executable module's logic acts only on DON states. Triggers are specifically attached to the associated logic A trigger may depend on an external event or state, on the current time, or on the DON state. An executable module can be similar in its capabilities to a smart contract, but, in the disclosed implementations, differs from conventional smart contracts in several ways.

First, unlike a smart contract (or permissioned analogs, such as Hyperledger Chaincode), an executable module can run in response to a trigger. Stated differently, an executable module can run autonomously. Triggering is a key feature of oracle systems, in the sense that such systems initiate calls to smart contracts without user input. DONs generalize this capability. Triggers in DONs may be viewed as a way of specifying the service agreements that apply to an executable module, as the triggers define the circumstances under which the DON must call it. An executable module can perform confidential computation, computing over confidential data and even concealing intermediate results.

Second, an executable module can operate within the trust model defined by the DON. To instantiate the trust model realized by a permissionless blockchain (main chain), it can include a mechanism for interacting with such a blockchain. A DON can control an account on a blockchain and thus control assets on it through a connector module. But a DON typically does not authoritatively represent assets created on chain, e.g., Ether or ERC20 tokens. It is often desirable that DONs may have limited lifetimes, as defined by their service providers.

As a permissioned system, i.e., a system limited to permissioned nodes, a DON can store data persistently at much lower cost than a permissionless blockchain because the DON produces fewer replicas on its ledger as compared to public blockchains. Additionally, a DON can store and compute on confidential data. DONs can leverage a simple memory management model common to smart contract systems, i.e. that an executable module may only act on its own memory. Executable modules may, however, communicate with other executable modules.

The MS of disclosed implementations facilitates fair Decentralized Finance (DeFi) applications by providing mechanisms that support developers to build DeFi contracts that are not subject to transaction ordering that unduly advantages a subset of users. In existing permissionless systems, transactions are ordered entirely at the discretion of miners or other validators. This is a form of largely unrecognized ephemeral centralization in otherwise decentralized systems. A miner can (temporarily) censor or reorder transactions for its own benefit, a notion referred to as miner-extractable value (MEV). Even when miners order transactions simply based on fees (e.g., gas), without manipulation, users themselves can manipulate gas prices to result in transaction ordering that advantages their own transactions over those of less sophistication. These practices harm users of DeFi systems and even threatens the stability of the underlying consensus layer in a blockchain.

MS is a set of tools to decentralize and rationalize transaction ordering. In disclosed implementations, MS includes three components. The first component is monitoring of transactions. Nodes in a DON will both monitor the mempool of a main chain and, optionally, permit off-chain submission of transactions through a specialized channel. The second component is sequencing of transactions. In disclosed implementations, the oracle nodes will order transactions for a relying contract (also referred to as "target contract" herein) on the main chain according to a policy defined for that relying contract. The third component is posting of transactions. After the transactions are ordered, the DON sends the transact ions to the mainchain with associated ordering information as described below.

The potential benefits of MS include:
1. Order-fairness: MS includes protocols and data structures to ensure that transactions input to a particular contract are ordered in a way that doesn't give an unfair advantage to well-resourced and/or technically savvy users.
2. Reduced transaction cost: By eliminating the need for speed in submit-ting transactions to a smart contract, MS can reduce the cost of transaction processing.
3. Protective ordering: MS can give critical transactions special priority ordering. For example, to prevent front-running attacks against oracle reports. MS can insert an oracle report into a stream of transactions retroactively.
4. New services: The ability to monitor a main chain mempool in a decentralized way can give rise to new main chain services. An example is "priority channels", i.e., smart contract enforced futures on block space that ensure that critical transactions are processed in a timely way during periods of blockchain congest ion.

Figure 2:
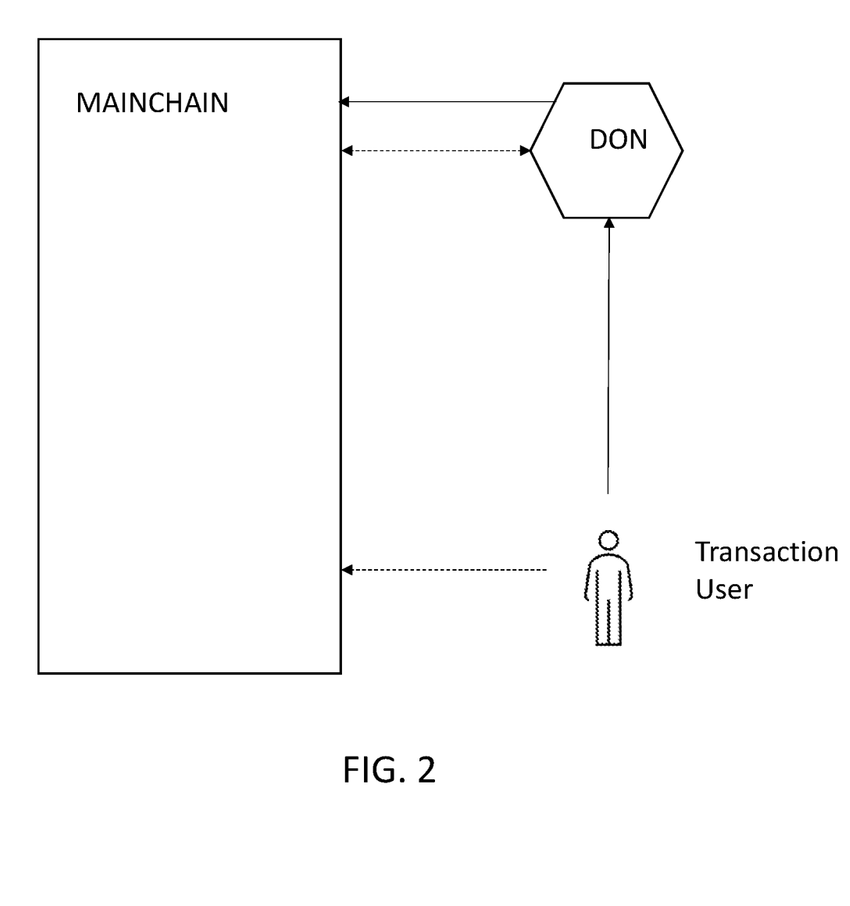
FIG. 2 is a high-level schematic diagram of a disclosed implementation

MS allows developers to enforce policies that help meet their design goals for DeFi. the policies can be specified by the function modules of the DON. FIG. 2 is a general schematic of the operation of the MS service in accordance with disclosed implementations. The MS service can be decomposed into three phases, corresponding to the functions noted above: (1) Transaction monitoring; (2) Transaction ordering; and (3) Transaction posting.

There are at least two different approaches for MS to monitor user transactions destined for a specific smart contract, direct and mempool-based. In direct monitoring (indicated by solid lines in FIG. 2), transactions are sent directly from user devices to the DON nodes, as opposed to the nodes of the main chain. The DON collects user transactions destined to a specific smart contract (SC), and orders them based on an ordering policy. The DON then sends the ordered transactions to the smart contract on the mainchain. In mempool-based monitoring (indicated by the dashed lines in FIG. 2), the DON can monitor the mainchain's mempool and collect transactions intended for a specific smart contract SC. Then, the DON orders these transactions according to the policy and sends the ordered transactions to the smart contract. Alternatively, a hybrid monitoring approach can be applied. In hybrid monitoring, user devices send transaction into the mainchain's mempool while critical transactions (e.g., oracle reports) are sent to DON nodes directly (in particular, the set of nodes providing oracle reports such as price feed updates and the set of nodes providing mempool services may overlap or be identical).

MS can be applied to guarantee that user transactions are ordered according to a pre-defined (presumably fair) policy. The nature of this policy will depend on the business needs of the application and the types of transaction ordering abuses that are to be prevented. For example, if a SC's main concern is a dishonest miner that does not order transactions based on fees, then a simple ordering policy for the MS could be to enforce that transactions are sequenced based on transaction fees. In this example, the miner's power to censor or re-order transactions is now diluted among the decentralized DON nodes and the policy can be enforced in accordance with a conventional consensus mechanism.

A DON could also implement a policy that guarantees that certain critical transactions, such as oracle updates, are sequenced first among a set of transactions regard less of paid fees, thereby preventing attacks based on oracle frontrunning. To prevent frontrunning strategies based on elevated transaction prices, and to generally achieve ordering of transactions based on a principled approach to fairness, various protocols that enforce order fairness can be applied. Examples of such protocols are discussed below.

Kelkar et al., *Order-fairness for byzantine consensus*. IACR Cryptol. ePrint Arch. 2020 (2020), 269 teaches a protocol intended to achieve something like a natural policy in which transactions are ordered based on the time they are shared with the network. In a decentralized system, however, different nodes may see transactions arrive in a different order. This makes consensus on a total ordering of transactions impossible in general. Kelkar et al. show that a weaker notion of "block-ordered fairness" is achievable in which groups of transactions may belong to the same "block," in the sense of being equally ordered. Roughly speaking, then, order-fairness states that if a large fraction of nodes see transaction $r_1$ before transaction $r_2$, then $r_1$ will be sequenced before $r_2$ or in the same block as $r_2$. Kelkar et al. propose a family of protocols for different network settings, including synchronous, partially synchronous, and asynchronous called Aequitas. Aequitas protocols impose significant communication overhead relative to basic consensus/BFT, and thus aren't ideal for practical use in conventional systems. Other, notions of order fairness have recently been proposed. Various policies can be specified and enforced by the disclosed implementations based on the needs of the DeFi application and potential threats.

After collecting and ordering user transactions in accordance with a policy, the DON sends these transact ions to (or back to) the main chain. As such, a DON's interactions with the main chain remain subject to (potentially unfair) transaction ordering governed by the main chain's miners. To harness the benefits of decentralized transaction ordering, the target smart contract SC thus has to be designed to treat the DON as a "first-class" citizen. The disclosed implementations can apply two approaches.

One approach is to have the main chain smart contract SC only accept transactions that have been processed by the DON. This ensures that the smart contract processes transactions in the order proposed by the DON, but restricts the smart contract to operating in a permissioned system (i.e., the DON now has the power to not only determine the ordering of transactions, but to permanently censor transactions destined for this smart contract).

Another, more granular, approach has the mainchain smart contract accept transactions originating both from the DON and directly from legacy users, but places traditional "speed bumps" on transactions that were not processed by the DON. For example, transactions from the DON may be processed immediately, whereas legacy transactions require a standard "commit-reveal" protocol to prevent frontrunning. Such "speed bumps" are described in more detail below. This ensures that DON-ordered transactions do get processed in the agreed upon order, without giving the DON the ability to censor transactions.

The decentralized order-fairness guarantees of MS require transactions to be aggregated "off-chain" However, the transaction ordering process can be combined with other aggregation techniques that aim to reduce on-chain processing costs. For example, after collecting and ordering transactions, the DON may send these transactions to the main chain as a single "batched transaction" (e.g., a rollup), thereby reducing the aggregate transaction fees.

The main chain smart contract and the corresponding DON can be "co-designed" to guarantee that the DON's transact ion ordering is upheld. For example, the DON can append a sequence number to each transaction and send these transactions to the main chain's mempool with the sequence numbers as metadata or with other ordering information. The main chain smart contract can be designed to ignore transactions that arrive "out-of-sequence." In this scenario, the main chain miners can decide to ignore the DON's transaction ordering, thereby causing transactions to fail. It is possible to enforce transaction ordering by monitoring the smart contract state. Alternatively, the DON can aggregate multiple transactions in a rollup (or in a bundle similar to a rollup). In this scenario, the mainchain smart contract can be designed to handle such aggregate transactions. In another alternative, the DON can bundle transactions into one "meta-transaction" for the main chain and utilize a conventional proxy smart contract to unpack the transactions and relay them to the target contract. This technique can be useful for legacy compatibility.

The proxy smart contract design has the advantage of seamlessly supporting user transactions that are themselves proxied through a main chain contract before reaching the DON's target contract. For example, consider a user that sends a transaction to some wallet contract, which in turn sends an internal transaction to the target smart contract. Assigning a sequence number to such a transaction could be complicated, unless the user's wallet contract is specially designed to forward the sequence number with every internal transaction to the target smart contract. Similarly, such internal transactions cannot be easily aggregated into a meta-transaction that is sent directly to a smart contract. It is also possible, of course, simply for the DON to sign transactions using a threshold signature and use the built-in Ethereum nonce to ensure correct ordering.

High-frequency traders in conventional electronic marketplaces invest considerable resources to obtain superior network speed and traders in cryptocurrency exchanges can do the same in an attempt to gain advantage. Network speed confers an advantage both in observing the transactions of other parties and in submitting competing transactions. One remedy deployed in practice is the above noted "speed bump". This is a mechanism for imposing a delay (350 microseconds, for example) on access to the market, with the aim of neutralizing advantages in speed. Empirical evidence supports the efficacy of speed bumps in decreasing certain trading costs for ordinary investors. MS can be used straightforwardly to implement an asymmetrical speed bump, i.e., one that delays incoming transactions.

Centralized trading systems typically receive transactions through a single network connection. In a decentralized system, by contrast, transactions might propagate from multiple vantage points. Consequently, it is possible to observe behaviors such as network flooding in a P2P network. MS can be applied to specify policies prohibiting such undesirable network behaviors.

Order fairness requires enforcement of an ordering on transactions that takes into account time of delivery in the network. A limitation of this notion of fairness is that it does not prevent attacks in which an adversary gains an advantage by flooding a system with many transactions, a strategy known to have performed transaction "sniping" in token sales and created congestion resulting in liquidation of collateralized debt positions (CDPs) in MakerDAO. In other words, order fairness enforces fairness with respect to transactions, not transactors (i.e., participants).

The selection of nodes to operate the independent blockchains that constitute DON's, protocols to use, and how data will be aggregated or otherwise processed is, of course, important to achieve effective fair ordering of transactions.

Various DLT protocols can be used in connection with disclosed implementations with the appropriate triggers/triggering events being designed in accordance with the system.

For example, Hyperledger Fabric is a decentralized protocol that supports an analog of smart contracts called "Chaincode". A piece of Chaincode serves as the interface for on-ledger assets. Chaincode is invoked directly by a user by sending a transaction to a set of Endorsing Peers, which check signatures on the transaction and then simulate and endorse the transaction if it is valid. The user then submits the endorsed transaction to an ordering service, which passes the transaction to Committing Peers, which verify that the transaction is fresh (i.e., that its included read state is consistent with the current state of the ledger) and then commits it on the ledger.

There are several ways of instantiating oracle functionality on Hyperledger Fabric. Hyperledger Fabric provides what is in essence a permissioned version of layer-1 blockchain functionality. Consequently, it does not explicitly integrate trigger or other explicit support for oracle functionality. Hyperledger Fabric does provide a flexible enough architecture so that triggers can be encoded into a piece of Chaincode Therefore, DONs can be applied to systems based on Hyperledger Fabric protocol or any other decentralized P2P protocol that includes or can be adapted to include triggering events.

A number of algorithms have been proposed for fair transaction ordering. One approach is to mitigate the threat of front running by temporarily concealing transactions, thereby preventing a front runner from learning transaction data in time to take advantage of its advance knowledge. In these implementations users commit to (or encrypt) their transactions and only reveal them once the transactions have been ordered within the system. One challenge in such approaches is that a user may commit to a transaction speculatively, and only reveal it later if subsequent transact ions make it profitable. The TEX exchange addresses this problem using a clever approach in which encrypted transactions include a decryption key obtainable by computing a verifiable delay function (VDF). If a user fails to decrypt her transact ion in a timely way, others in the system can then decrypt on her behalf.

An alternative approach called "Submarine" conceals the existence of transactions entirely in a smart contract system. A user commits a transaction for the smart contract by sending currency to a specially constructed address that has two properties: (1) the currency can only be claimed by the smart contract and (2) before the currency is claimed, it looks like an ordinary, randomly generated fresh address. To reveal their transaction to the smart contract, a user reveals a key that enables the currency to be transferred to the smart contract.

These approaches have some drawbacks. First users must perform two actions in order to submit a transaction, which can result in a poor user experience. Second, the identity of a user sending a transaction can reveal information about the transact ion type. For example, a user that tends to trade a particular asset might be expected to continue to do so. Third, even if an adversary cannot learn the details of users' transactions, if it can order transactions (e.g., a miner in Ethereum), it can favorably order its own transactions.

The nodes in a DON can perform threshold decryption of ciphertexts and thus can order transactions and subsequently decrypt them, ensuring that ordering is not based on trans- action details. Further, rather than being decrypted and subsequently ordered, transactions can be processed within a "dark" environment, known as a "dark pool". Dark pools are private networks that are not accessible by the public. In principle a DON can process transactions using secure multiparty computation, although this would be impractical. More practical approaches are possible using a trusted execution environment (TEE).

It can be seen that a DON (an oracle network) can order the transactions sent to an associated target smart contract, including both user transactions and oracle reports. Oracle nodes ingest transactions and then reach consensus on their ordering (e.g., using a conventional consensus protocol), rather than allowing a single leader to dictate the order of transactions. Oracle nodes then forward the transactions to the smart contract. The transactions can be sequenced by various forms of ordering information such as attaching a nonce or sequence numbers to the transactions as metadata or being sent to the mainchain in batches. The disclosed implementations thereby decouple the ability to extract MEV from the ability to mine blocks. The disclosed implementations remove the temporary centralization of mining and decentralizes the process of transaction ordering. Transactions can be ordered by the oracle network based on various algorithms and criteria stored as a policy. For example, transactions can be ordered based on time of arrival, i.e., a "first-come-first-serve" basis.

Figure 3:
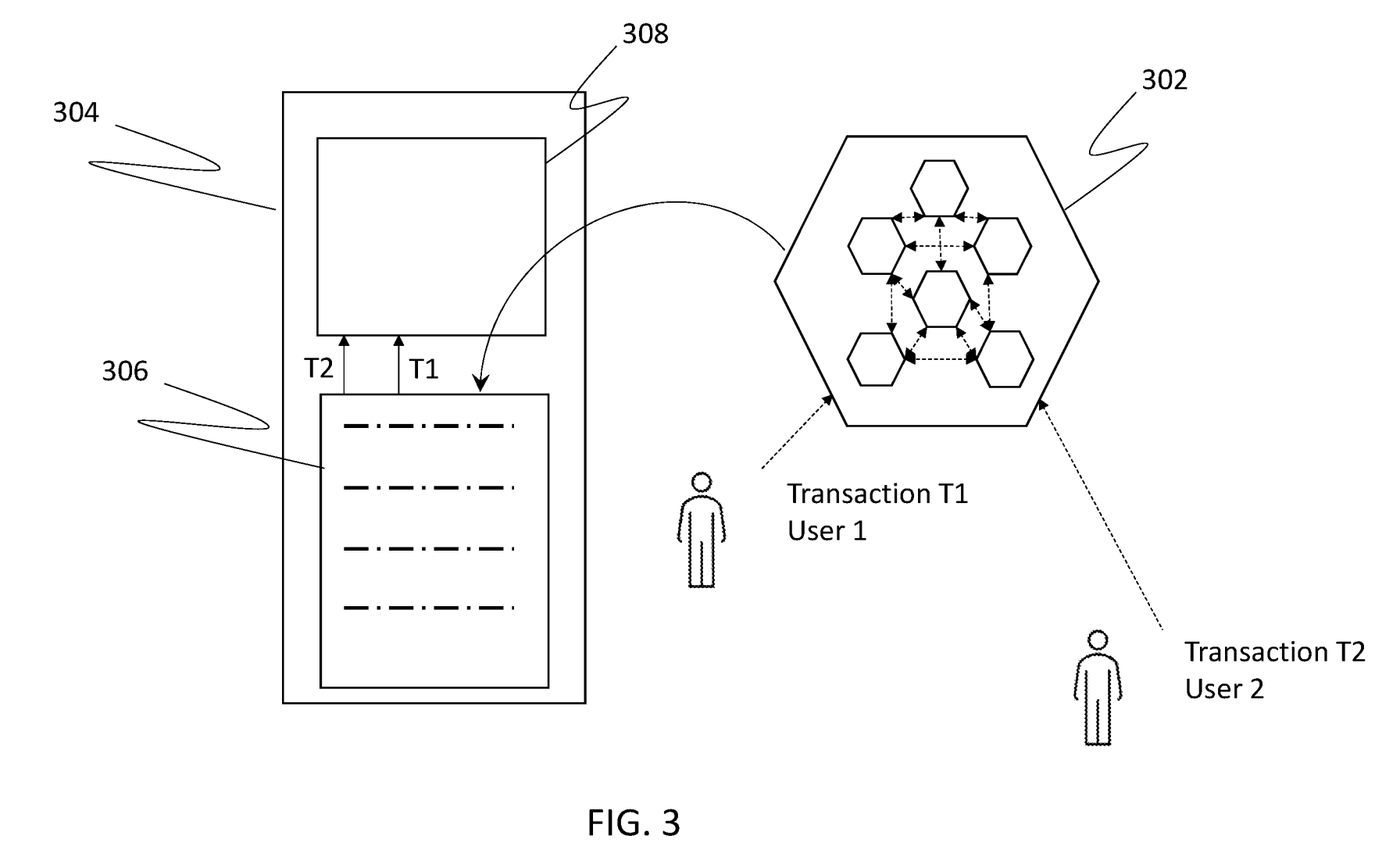
FIG. 3 is a detailed schematic diagram showing the data flow of a first example in accordance with disclosed implementations.

As discussed above, users can submit transactions directly to the oracle network. To make fair ordering work by giving multiple nodes a perspective on transaction order, a user can submit their transaction simultaneously to multiple nodes. This data flow is shown in more detail in FIG. 3. As shown in FIG. 3, user 1 submits a transaction T1 to oracle network 302 and user 2 submits transaction T2 to Oracle network 302. The transactions T1 and T2 are ordered by oracle network 302, in accordance with a policy enforced by oracle network 302. The policy can be stored as an executable module on oracle network 302 or as a smart contract in another decentralized system. Once ordered, the transactions are sent to mempool 306 of blockchain 304 with ordering information expressed by, for example associated ordering metadata or by aggregating the transactions to indicate transaction order. The transactions are then processed out of mempool 306 in the specified order and mined to be recorded on the ledger of blockchain 304 in a conventional manner.

Figure 4:
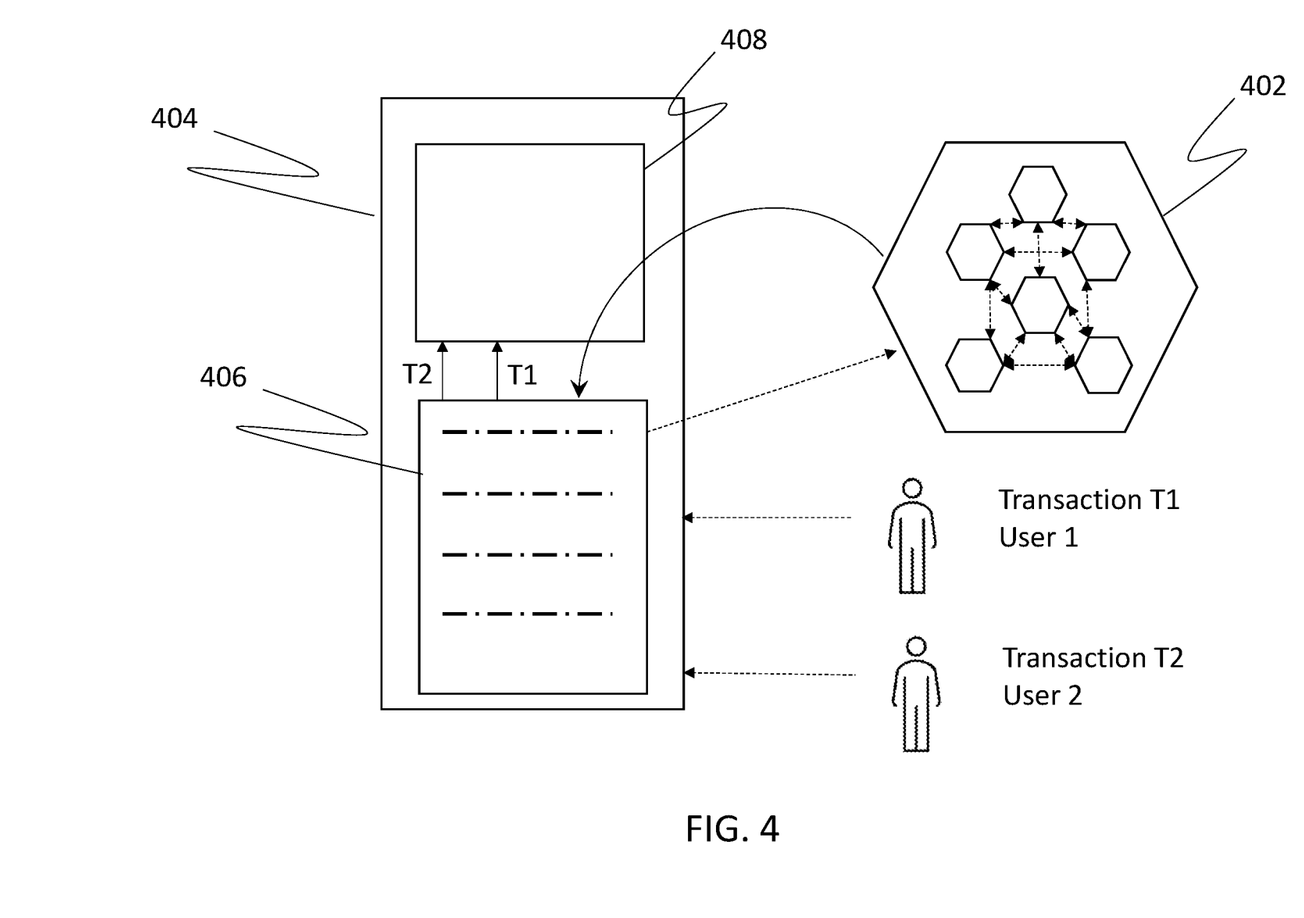
FIG. 4 is a detailed schematic diagram showing the data flow of a second example in accordance with disclosed implementations.

Alternatively, oracle nodes can monitor the mempool of a target blockchain and pluck transactions from it on behalf of a relying smart contract. Oracle nodes typically use web services as data sources. But they can also treat the mempool as a data source and generate reports that correspond to user transactions. As shown in FIG. 4, user 1 submits a transaction T1 to blockchain 404 and user 2 submits transaction T2 to blockchain 404. The transactions T1 and T2 are confirmed as valid and then are stored in mempool 406 of blockchain 404, in a conventional manner, prior to being recorded on the ledger of blockchain 404. Mempool services of oracle network (a DON) 402 are used to pull the transactions from mempool 306 and order the transactions, by oracle network 402, in accordance with a policy enforced by oracle network 402. Once ordered, the transactions are sent back to mempool 406 with associated ordering information. The transactions are then processed out of mempool 406 in the specified order and mined to be recorded on the ledger of blockchain 404. Other aspects of this example are similar to the example of FIG. 3.

The use of the mempool as discussed with respect to FIG. 4 yields two technical advantages. First, users can transmit transactions directly to the blockchain—there is no need to provide users with special-purpose software for interacting with the oracle network. Second, transaction costs are lower because, if getting a transaction into the mempool suffices to ensure receipt, then users don't need to worry about mining speed. When these transactions are eventually mined, they provide an auditable record showing that transactions were not censored. The oracle network can re-transmit sequenced user transactions to a relying target smart contract with a high gas price, ensuring timely processing. But by using batching, rollups, or any of a number of other techniques, the network can keep per-transaction costs low.

As an example, the policy can specify that transactions must be ordered by time of arrival in the mempool, in the example shown in FIG. 4. The oracle network can monitor the transactions, order them by time of arrival in the mempool, and forwards them to the mempool with ordering information, such as metadata, or send the transactions directly to the target smart contract in the appropriate order.

Peer-to-peer networks are complicated, and an adversary with many peers and a fast network connection might be able to front-run users. But if oracle nodes have peers distributed throughout the network and actively detect flooding and other deceptive practices by adversaries, they can significantly raise the bar for front-running attempts. Additionally, some of the same techniques that have been proposed to combat front-running directly in smart contracts (e.g., commit-reveal schemes or verifiable delay functions) could also be applied by the oracle nodes of a DON. The crucial advantages here is that the oracle nodes of a DON can implement these defenses off-chain with respect to the mainchain, and prevent front-running on much smaller time scales (on the order of the network delay, rather than the block interval). The disclosed implementations also enable new, simpler approaches to combat front-running at the network-level. For example, users can threshold-encrypt transactions sent to oracle nodes, so that the transaction content is revealed only after the transaction ordering has been agreed upon. Encrypting transactions prior to ordering them is a simple and powerful way of defeating front-running in DeFi systems based on transaction content but cannot prevent more subtle forms of front-running based on metadata alone.

There are several cryptographic techniques that can be used to preserve causality. In commit-reveal protocols, instead of announcing the transaction in clear, only a cryptographic commitment to the transaction is broadcast to the network. After all committed but hidden transactions have been ordered (by the DON, for example), the sender must open the commitment and reveal the transaction data within a predetermined time interval. The network then verifies that the opening satisfies the earlier commitment. Although it is particularly simple, the approach introduces considerable drawbacks and is not easy to employ for two reasons. First, since only the commitment exists at the level of the ordering protocol, the semantics of the transaction cannot be validated during consensus. An additional round-trip to the client is required for validation. More severely, though, weighs the possibility that no opening may ever arrive, which could amount to a denial-of-service attack. Furthermore, it is difficult to determine whether the opening is valid in a consistent, distributed manner because all participants must agree on whether the opening arrived in time.

Commit-reveal protocols address the problem of delayed recovery addresses using a clever approach in which encrypted transactions include a decryption key obtainable by computing a verifiable delay function (VDF). If a client fails to decrypt their transaction in a timely way, others in the system will decrypt it on their behalf by solving a moderately hard cryptographic puzzle. Threshold encryption exploits that the DON may perform threshold-cryptographic operations. Assume the FSS maintains an encryption public and the oracles share the corresponding private key among themselves. Clients then encrypt transactions under the public key and send them to the sequencing system which orders transactions, then decrypts them, and finally injects them into the main chain in the fixed order. Encryption therefore ensures that ordering is not based on the transaction content, but that the data itself is available when needed.

Threshold cryptography can also be used as a consensus-level mechanism for generic messages and for general computations with shared data. Compared to commit-reveal protocols, threshold encryption prevents simple denial-of-service attacks and lets the DON proceed autonomously, at its own speed and without waiting for further client actions. Transactions may be validated immediately after they have been decrypted. Moreover, clients can encrypt all transactions with one key for the DON and the communication pattern remains the same as with other transactions.

Committed secret sharing uses a client secret-share for the nodes in the DON. Using a hybrid, computationally secure secret sharing scheme, the transaction is encrypted first using a symmetric cipher with a random key. Only the corresponding symmetric key is shared and the ciphertext is submitted to the DON.

The client must send one key share to each node in O using a separately encrypted message. The remaining protocol steps are the same as with threshold encryption, except that the transaction data is decrypted with the symmetric algorithm after reconstructing the per-transaction key from its shares. This does not require setup or management of a public-key cryptosystem associated with the DON.

Although the cryptographic methods offer complete protection against information leaking from submitted transactions to the network, they do not conceal metadata. For example, an IP address or an Ethereum address of the sender could still be used by an adversary to perform front-running and other attacks. Various privacy-enhancing techniques deployed at the network layer, or the transaction layer, would be needed to accomplish this goal. The impact of a particular piece of metadata, namely to which contract a transaction is sent, can be (partially) concealed through multiplexing many contracts on the same DON. Secure causality as guaranteed by cryptographic protocols complement the order fairness guarantees for any policy. If an attacker cannot gain significant advantage from observing metadata, the secure causality-preservation protocols could be used alongside a native ordering approach as well. For example, oracle nodes can write transactions to the ledger as soon as they receive them, without duplication. Transactions would then be ordered according to their appearance on the ledger and subsequently decrypted.

The disclosed implementations can be accomplished by one or more computing platforms which may include electronic storage and one or more computer processors configured to execute computer program modules. The computer program modules may be configured to enable a user associated with the computing platform to interface with the computing platforms. By way of non-limiting example, the computing platforms may include one or more of a desktop computer, a laptop computer, a handheld computer, a tablet computing platform, a NetBook, a Smartphone, a gaming console, and/or other computing platforms.

The various computing platforms may include communication lines, or ports to enable the exchange of information with a network and/or other computing platforms. Electronic storage may include non-transitory storage media that electronically stores information, such as data and executable code. The electronic storage media may include one or both of system storage that is provided integrally (i.e., substantially non-removable) and/or removable storage Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information and/or other information that enables the computing platforms to function as described herein. Processor(s) may include one or more of a digital processor, an analog processor, a digital circuit designed to process information, an analog circuit designed to process information, a state machine, and/or other mechanisms for electronically processing information. Processor(s) may be configured to execute modules by software; hardware; firmware; some combination of software, hardware, and/or firmware; and/or other mechanisms for configuring processing capabilities on processor(s).

As used herein, the term "module" may refer to any component or set of components that perform the functionality attributed to the module. This may include one or more physical processors during execution of processor readable instructions, the processor readable instructions, circuitry, hardware, storage media, or any other components. As noted above, any blockchain, or other, protocol can be used in connection with the implementations. The various functions can be provided by smart contracts on the blockchain(s) or by conventional computing logic such as executable code or scripts.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A transaction ordering system for sequencing transactions processed by a decentralized network in which nodes communicate with a peer-to-peer protocol to process transactions, the system comprising:
an auxiliary decentralized network including multiple oracle nodes communicating through a peer-to-peer protocol, wherein the auxiliary decentralized network is distinct from the decentralized network and wherein the auxiliary decentralized network is configured to;
receive a set of transactions to be executed by the decentralized network;
create, based on a predetermined policy, ordering information indicating a sequence in which transactions in the set of transactions are to be processed; and
transmit the ordering information to the decentralized network for execution of the transactions, by the decentralized network, in the sequence.

2. The system of claim 1, wherein the auxiliary decentralized network is associated with a target smart contract executing on the decentralized network and wherein the transactions in the set of transactions are transactions to be processed by the target smart contract.

3. The system of claim 1, wherein the set of transactions are received from a mempool of the decentralized network.

4. The system of claim 1, wherein the set of transactions are received directly from at least one user.

5. The system of claim 1, wherein each oracle node includes an executable module and a connector module.

6. The system of claim 5, wherein each of the executable modules include logic and specify one or more triggering events corresponding to the logic, wherein the triggering events are based on at least one of the state of the auxiliary decentralized network, the current time, an external event, and/or an external state.

7. The system of claim 3, wherein the set of transactions are received from a mempool of the decentralized network through a mempool service configured to monitor the mempool of the decentralized network.

8. The system of claim 5, wherein the policy is expressed by the logic of the function modules and enforced by a consensus mechanism of the auxiliary decentralized network.

9. The system of claim 8 wherein the policy orders the transactions based on transaction fees.

10. The system of claim 8 wherein the policy orders the transactions based on the time of the transaction submission.

11. The system of claim 8, wherein the policy orders the transactions based on a collective time of transactions observed across oracle nodes.

12. The system of claim 1, wherein the decentralized network is configured to process transactions for the exchange of value in the form of main chain assets.

13. The system of claim 1, wherein the ordering information is transmitted to a mempool of the decentralized network.

14. The method of claim 1, wherein the transactions include encrypted transaction data and, after creating the ordering information, the transaction data is decrypted.

15. A method for sequencing transactions processed by a decentralized network in which nodes communicate with a peer-to-peer protocol to process transactions, the method being accomplished by an auxiliary decentralized network including multiple oracle nodes communicating through a peer-to-peer protocol, wherein the auxiliary decentralized network is distinct from the decentralized network, the method comprising;
receiving a set of transactions to be executed by the decentralized network;
creating, based on a predetermined policy, ordering information indicating a sequence in which transactions in the set of transactions are to be processed; and
transmitting the ordering information to the decentralized network for execution of the transactions, by the decentralized network, in the sequence.

16. The method of claim 15, wherein the auxiliary decentralized network is associated with a target smart contract executing on the decentralized network and wherein the transactions in the set of transactions are transactions to be processed by the target smart contract.

17. The method of claim 15, wherein the set of transactions are received from a mempool of the decentralized network.

18. The method of claim 15, wherein the set of transactions are received directly from at least one user.

19. The method of claim 15, wherein each oracle node includes an executable module and a connector module.

20. The method of claim 19, wherein each of the executable modules include logic and specify one or more triggering events corresponding to the logic, wherein the triggering events are based on at least one of the state of the auxiliary decentralized network, the current time, an external event, and/or an external state.

21. The method of claim 17, wherein the set of transactions are received from a mempool of the decentralized network through a mempool service configured to monitor the mempool of the decentralized network.

22. The method of claim 19, wherein the policy is expressed by the logic of the function modules and enforced by a consensus mechanism of the auxiliary decentralized network.

23. The method of claim 22 wherein the policy orders the transactions based on transaction fees.

24. The method of claim 22 wherein the policy orders the transactions based on the time of the transaction submission.

25. The method of claim 22, wherein the policy orders the transactions based on a collective time of transactions observed across oracle nodes.

26. The method of claim 15, wherein the decentralized network is configured to process transactions for the exchange of value in the form of main chain assets.

27. The method of claim 15, wherein the ordering information is transmitted to a mempool of the decentralized network.

28. The method of claim 15 wherein the transactions include encrypted transaction data and after creation of the ordering information, the transaction data is decrypted.

\* \* \* \* \*